United States Patent [19]

Ikemoto et al.

[11] Patent Number: 4,604,698
[45] Date of Patent: Aug. 5, 1986

[54] ELECTRONIC TRANSLATOR

[75] Inventors: Yutaka Ikemoto, Nara; Ken Sawada, Ikoma, both of Japan

[73] Assignee: Sharp Kabushiki Kaisha, Osaka, Japan

[21] Appl. No.: 564,204

[22] Filed: Dec. 22, 1983

[30] Foreign Application Priority Data

Dec. 28, 1982 [JP] Japan ............................. 57-228792

[51] Int. Cl.[4] .......................................... G06F 15/38
[52] U.S. Cl. .................................... 364/419; 364/900
[58] Field of Search ............... 364/419, 900, 715, 710

[56] References Cited

U.S. PATENT DOCUMENTS

| | | | |
|---|---|---|---|
| 4,041,467 | 8/1977 | Cota et al. | 364/900 |
| 4,218,760 | 8/1980 | Levy | 364/900 |
| 4,328,562 | 5/1982 | Hashimoto | 364/900 |
| 4,339,806 | 7/1982 | Yoshida | 364/900 |
| 4,355,370 | 10/1982 | Yanagiuchi et al. | 364/900 |
| 4,383,306 | 5/1983 | Morimoto et al. | 364/900 |
| 4,412,305 | 10/1983 | Yoshida | 364/900 |
| 4,417,319 | 11/1983 | Morimoto et al. | 364/900 |
| 4,438,505 | 3/1984 | Yanagiuchi et al. | 364/900 |
| 4,460,973 | 7/1984 | Tanimoto et al. | 364/900 |
| 4,464,731 | 8/1984 | Nishimura | 364/900 |

FOREIGN PATENT DOCUMENTS

| | | | |
|---|---|---|---|
| 2014765 | 8/1979 | United Kingdom | 364/900 |
| 2076194 | 11/1981 | United Kingdom | 364/419 |

OTHER PUBLICATIONS

S. Takahashi, et al., English–Japanese Machine Translation (Proceedings of the International Conference on Information Processing, UNESCO, Paris, Jun. 1959), pp. 194–199.

*Primary Examiner*—Michael R. Fleming
*Attorney, Agent, or Firm*—Birch, Stewart, Kolasch & Birch

[57] ABSTRACT

An electronic translator including character input keys for inputting a first language word, a translator for translating the inputted first language word into the second language word, a retranslator for retranslating the second language word back to the first language word, and a display unit for displaying the inputted word, translated word and retranslated word.

9 Claims, 12 Drawing Figures

| | 10 | 11 | 12 | 13 | 14 | |
|---|---|---|---|---|---|---|
| | bloom | ハナ | ハナガサク | blossom | ハナ(ジュモクノ) | (1) |

| | 20 | 21 | | 50 | 51 | |
|---|---|---|---|---|---|---|
| | flower | ハナ(クサバナ) | | nose | ハナ(カオ) | (2) |

| JPN. WORDS | Reg. No. |
|---|---|
| ハナ | 11 |
| ハナ(カオ) | 51 |
| ハナ(クサバナ) | 21 |
| ハナ(ジュモクノ) | 14 |
| ハナガサク | 12 |
| ハナシ | 82 |
| ハナシカケル | 75 |

ELECTRONIC TRANSLATOR

BACKGROUND OF THE INVENTION

1. Field of the Invention

The present invention relates to an electronic translator for language translation.

2. Description of the Prior Art

Recently, a number of pocket size electronic translators have been proposed for translating from one language to another language.

Since the languages are developed under different historical backgrounds, languages usually do not correspond with each other in a word-to-word manner. For example, in one language, a word may be used as noun and verb forms, but in another language, a word corresponding to that word may be used only as a noun. Furthermore, the latter word may have other meanings. In other words, the homonyms of a word are not the same between different languages.

Therefore, in order to obtain a correct translated word with the use of a prior art electronic translator, the operator has to follow the steps of translating a first language word (referred to as an input word) into second language word (referred to as a translated word), and then translating the second language word back to the first language (referred to as a retranslated word). If the retranslated word is the same as the input word, the operator will know that the translated word obtained in the above steps is a correct translated word.

The above operation is, however, time consuming and is not suitable when the correct translated word is needed immediately.

SUMMARY OF THE INVENTION

The present invention has been developed with a view to substantially solving the above described disadvantage and has for its essential object to provide an improved electronic translator which can provide a retranslated word immediately without any additional operation.

It is also an essential object of the present invention to provide an electronic translator of the above described type which can mark a certain number of words and can recall the marked words any time when requested.

It is a further object of the present invention to provide an electronic translator of the above described type which can display an aiming word without inputting, or depositing, all the characters of the aiming word through the key input.

In accomplishing these and other objects, an electronic translator according to the present invention comprises input means for inputting a word of a first language, translating means for translating the inputted word into a second language word, retranslating means for retranslating the translated word back to the first language word, and indicating means for indicating the inputted word, translated word and retranslated word.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 1:
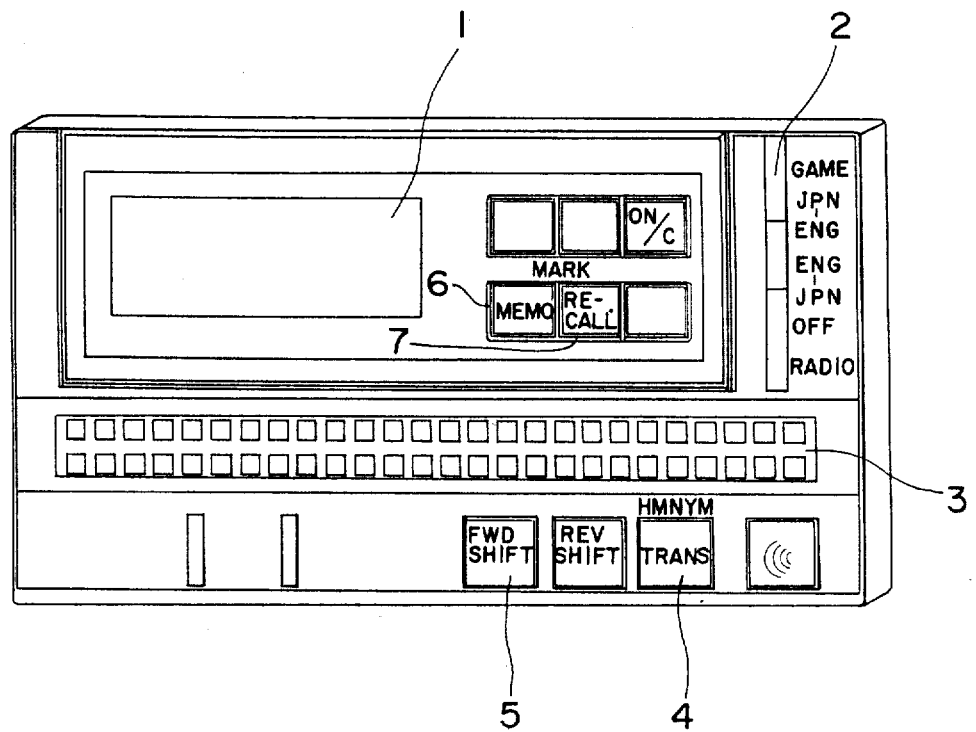
FIG. 1 is a front view of an electronic translator according to the present invention.

Referring to FIG. 1, a front view of a translator according to the present invention is shown. In FIG. 1, a reference number 1 designates a display unit of a liquid crystal dot-matrix type arranged to display characters in two rows. A reference number 2 designates a mode switch for selecting one of a plurality of operation modes which are: a radio mode under which the translator operates as a radio receiver; an off mode in which the power is turned off; an English-Japanese mode under which a translation from English to Japanese is carried out; a Japanese-English mode under which a translation from Japanese to English is carried out; and a game mode under which a game can be carried out. A reference numeral 3 designates an array of keys for inputting or depositing various characters, such as alphanumerical characters. A reference number 4 designates a translation/homonym key for effecting the translation and also calling for the homonyms. A reference number 5 designates a forward shift key; 6 designates a memory key for memorizing a word; and 7 designates a recall key for reproducing the memorized word.

Figure 2:
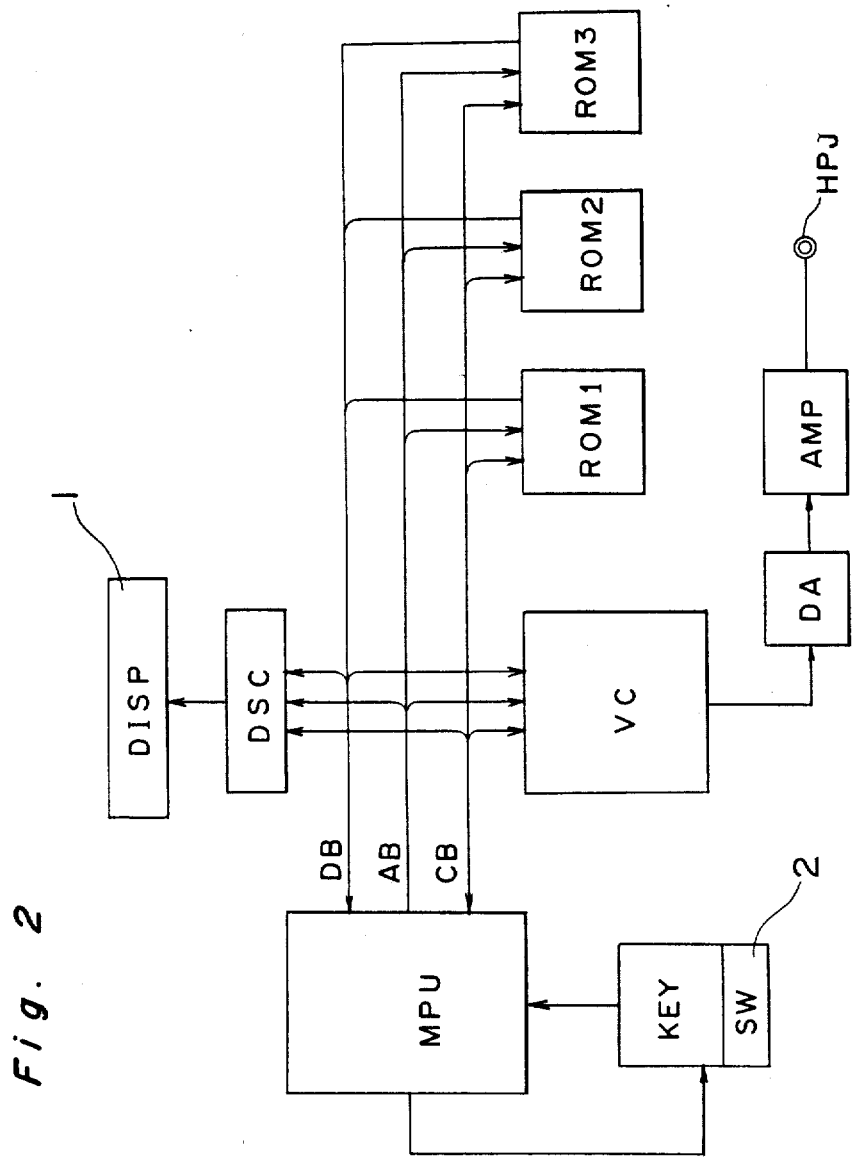
FIG. 2 is a block diagram of an electronic translator according to the present invention.

Referring to FIG. 2, a block diagram of the translator according to the present invention is shown. A display control DSC is coupled to display unit 1 for controlling the display of various characters through the display unit 1. A microprocessor MPU is coupled to key input portion KEY and mode switch 2 so that microprocessor MPU provides strobe signals to key input portion KEY and mode switch 2, and receives return signals for detecting the input condition. A reference character VC designates a composite voice control for composing voice signals in accordance with a sentence address or word address obtained from microprocessor MPU, thereby audibly producing sentences and words. DA designates a digital-to-analog converter, AMP designates a an amplifier for the voice signal, and HPJ designates a head-phone jack.

A read-only memory ROM1 (control ROM) is provided for storing various control programs for the microprocessor MPU, a read-only memory ROM2 (dictionary ROM) is provided for storing data of various sentences and words, and ROM3 (voice ROM) is provided for storing data of composite voice signals.

As shown in FIG. 2, the above described blocks DSC, VC, ROM1, ROM2 and ROM3 are connected to microprocessor MPU through data bus DB, address bus AB and control bus CB.

It is to be noted that display control DSC is defined by a random-access memory occupying a certain area for the display control such that each memory cell represents one dot on the display unit 1. By forming a bit-pattern within that certain area, a required image can be displayed through the display unit 1.

Next, the operation of the translator of the present invention is described with reference to flow charts shown in FIGS. 4-9.

Figure 4:
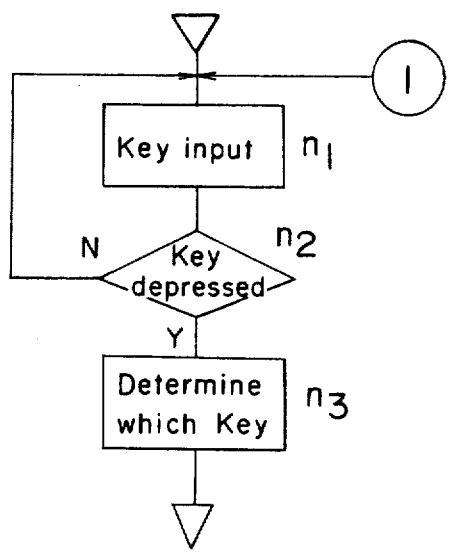
FIG. 4 is a flow chart for the operation when a key input is effected.

Referring to FIG. 4, the mode switch 2 is so turned as to select Japanese-English translation. When a key input is carried out at step n1, it is detected at step n2. Then, at step n3, it is discriminated which key has been depressed, thereby carrying out a procedure corresponding to the input key.

Figure 3:
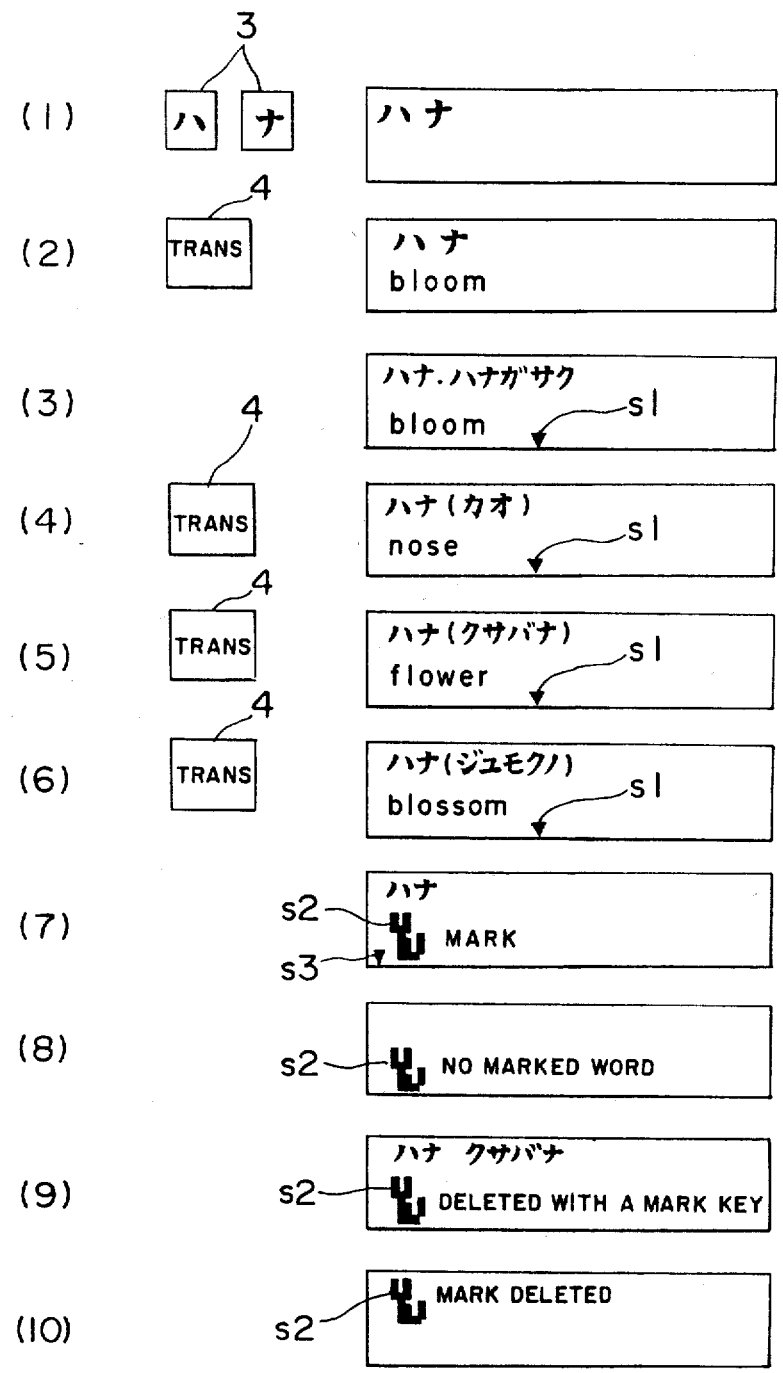
FIG. 3 is a diagrammatic view showing words displayed through a display unit together with a key operation under different situations.
Figure 5:
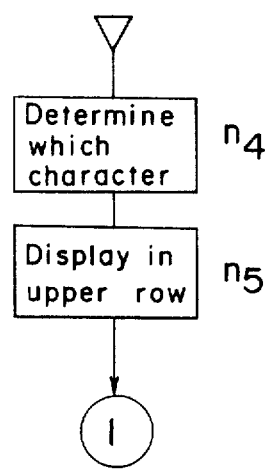
FIG. 5 is a flow chart for the operation when a character key input is effected.

Referring to FIG. 5, if the depressed key is a character key, it is determined which character has been depressed at step n4, and data corresponding to the depressed keys are sequentially stored in an input buffer (not shown). Then, in step n5, the input word is displayed in the upper row of the display unit 1, such as shown in FIG. 3, row (1). As an example, a Japanese word " ハナ " is inputted through the keys 3. This Japanese word is phonetically read as "hana", and its meaning is bloom, blossom, flower or nose.

Figure 6:
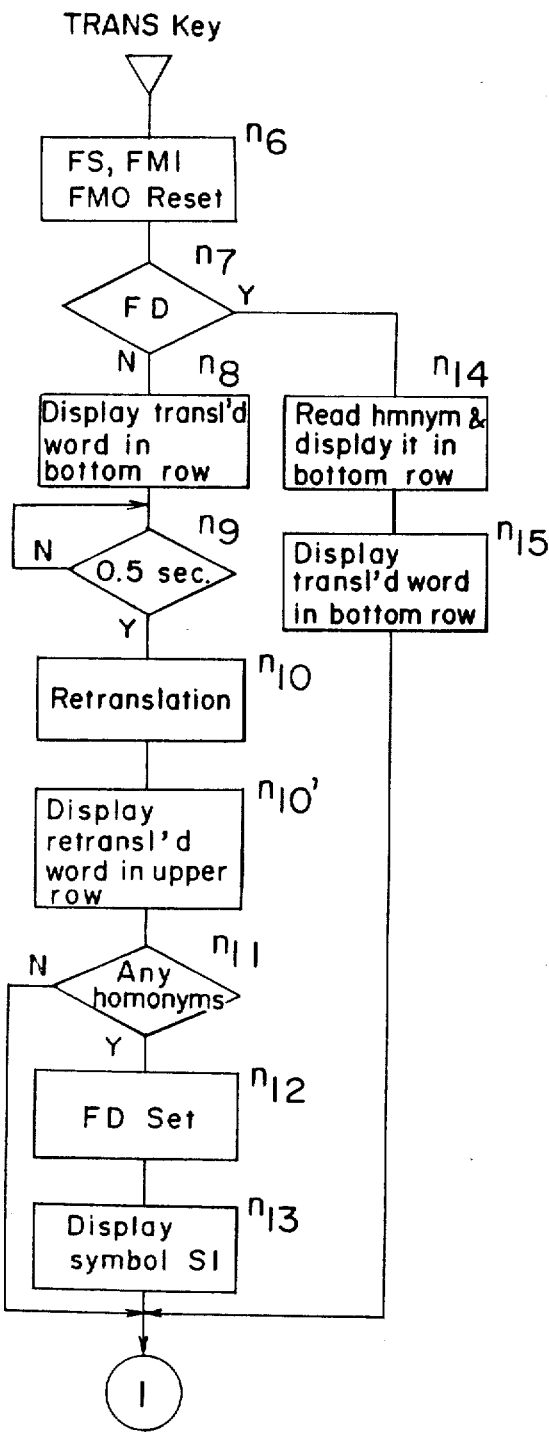
FIG. 6 is a flow chart for the operation when a translation key is depressed.

Thereafter, as shown in FIG. 6, when the translation key is depressed, flags FS, FMI and FMO are reset in step n6, and the present condition of a flag FD is detected at step n7. These flags are condition flags indicating following conditions when they are set.

FS: Forward shift key 5 has been depressed.
FMI: Mark key 6 has been depressed.
FMO: Recall key 7 has been depressed.
FD: There are a number of homonyms.

Since initially FD=0, the program proceeds from step n7 to n8. In the mean time, an English word for the input Japanese word "hana" is searched in the dictionary ROM, and at step n8, an English word "bloom", which is the first searched word, is displayed in the bottom row of the display unit 1, as shown in FIG. 3, row (2). After an interval of 0.5 second (step n9), the translated English word is translated back to Japanese (this translation is referred to as a retranslation) at step n10. And the retranslated Japanese word or words for the English word "bloom" are displayed in the display unit 1 bottom row in place of the originally inputted Japanese word at step n10'. In the example shown in FIG. 3, row (3), the retranslated Japanese words are " ハナ " (hana) and " ハナガサク " (hana-gasaku), which are the noun and verb forms of the bloom, respectively. Then, at step n11, it is detected whether or not there are any homonyms for the inputted Japanese word "hana". If there are homonyms, such as in the case of the given example, flag FD is set in step n12, and a triangle symbol S1 shown in FIG. 3, row (3) is produced at step n13 for the indication that there are a number of homonyms.

After step n13, if the translation key 4 is depressed again for the second time, the program proceeds through steps n7, n14 and n15 so as to further search the English word for the input Japanese word "hana" in the dictionary ROM. If the English word "nose" is the second searched word, the original Japanese word "hana" is displayed in the upper row of the display unit 1 with a comment, such as " カオ " (kao), which means face, given in parentheses, as shown in FIG. 3, row (4).

Then, after step n15, if the translation key 4 is depressed again for the third time, the program again proceeds through steps n7, n14 and n15 to further search another English word for the Japanese word "hana". This time, the translator may pick the English word "flower". Thus, the Japanese word "hana" is displayed with a comment, such as " クサバナ " (kusabana), which means plants, as shown in FIG. 3, row (5).

After that, if the translation key 4 is depressed again for the fourth time, the same steps n7, n14 and n15 are repeated. This time, the translator may pick the English word "blossom". Thus, the Japanese word "hana" is displayed with a comment, such as " ジュモク ノ " (jumoku-no), which means of trees, as shown in FIG. 3, row (6).

According to the preferred embodiment, the word to be translated, such as "hana" in the above example, can be obtained without inputting the full word "hana", but inputting the beginning part of the word, such as "ha". This can be done in the following steps.

Figure 7:
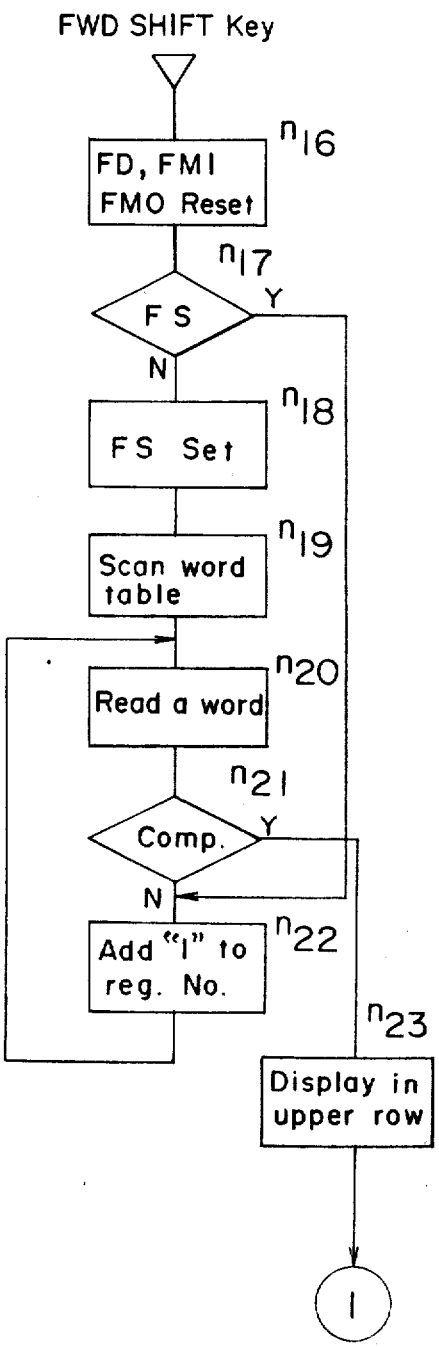
FIG. 7 is a flow chart for the operation when a forward shift key is depressed.

After inputting a beginning part of the word, such as "ha", forward shift key 5 is depressed, thereby starting the program shown in FIG. 7. At step n16, flags FD, FMI and FMO are reset. Since initially FS=0, the program advances through step n17 and step n18, at which the flag FS is set. Then, a word that starts from "ha" is searched in a Japanese word table containing Japanese words stored in Japanese alphabetical order (A I U E O . . . ) and a register number given to each word. This searching is carried out by calling up the word table at step n19, reading a word with a younger register number of the stored words at step n20, and comparing the beginning characters with the inputted characters "ha" at step n21. If these two do not match with each other, the program advances to step n22 at which "1" is added to the register number so as to read the next word in the table at step n20. Thereafter, a similar comparison is carried out repeatedly by repeating the steps n21, n22 and n20. When they match with each other, the program advances from step n21 to step n23 at which all the characters of a word that starts from "ha" are displayed.

If the word displayed in the display unit 1 is the word being looked for, the translation procedure can be carried out by depressing the translation key 4 in the manner described above. If the word is not the word being looked for, then, the operator may depress the forward shift key 5 again to search the next word that starts from "ha". In this case, the program advances through steps n17, n22, n20, n21 and n23. By repeating this operation, the operator may find the right word without inputting all the characters of the word.

Although the above operation is described so as to find the Japanese word, a similar operation is carried out to find the English word.

According to the preferred embodiment, a mark can be given to a certain number of words to have access to such words whenever they are requested. This function is suitable when learning words, when words are needed to be memorized or in similar situations. Marking the word is done by memory key 6 and reproducing the marked word is done by the recall key 7 through the steps described below.

Figure 8:
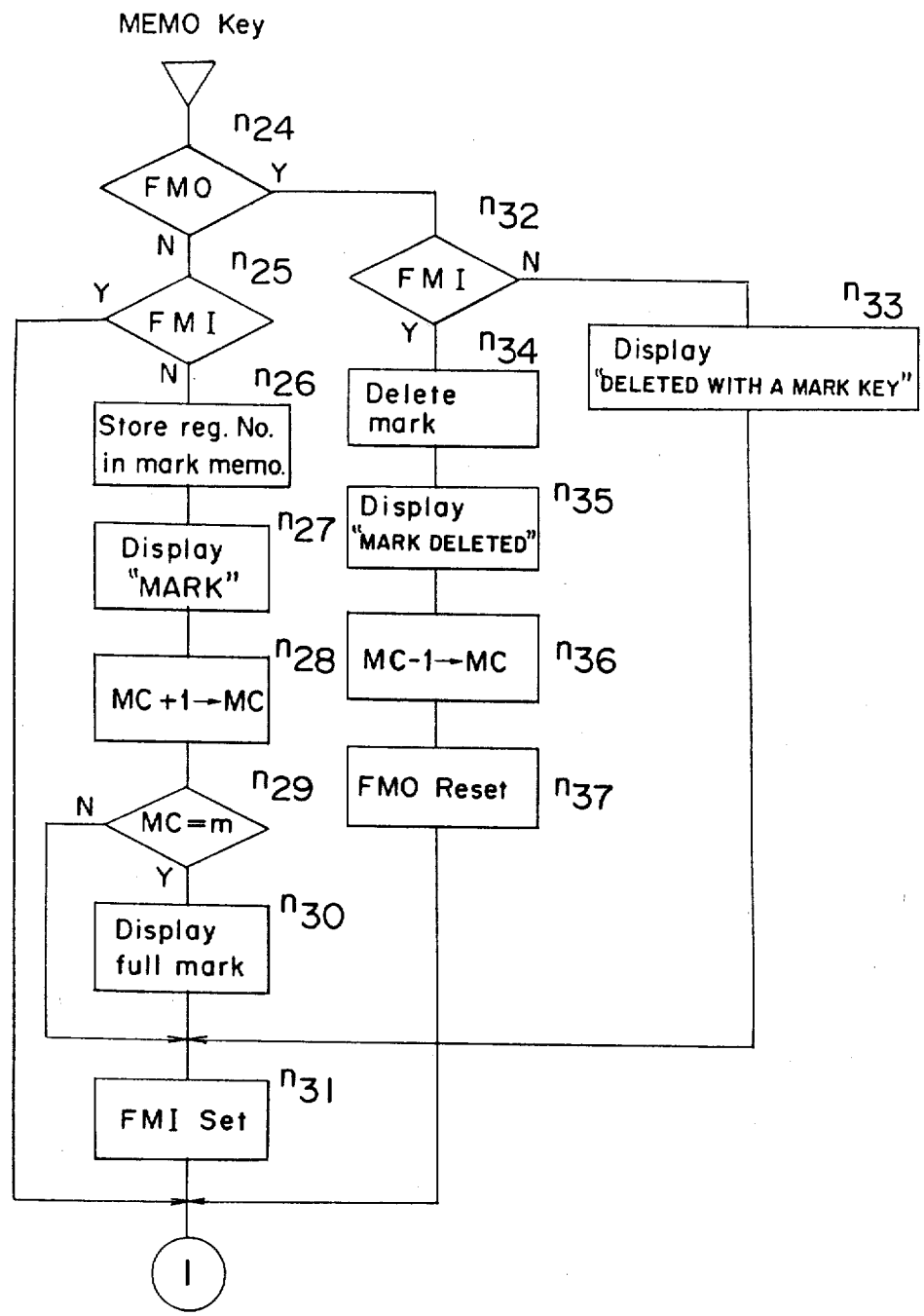
FIG. 8 is a flow chart for the operation when a memory key is depressed.
Figure 9:
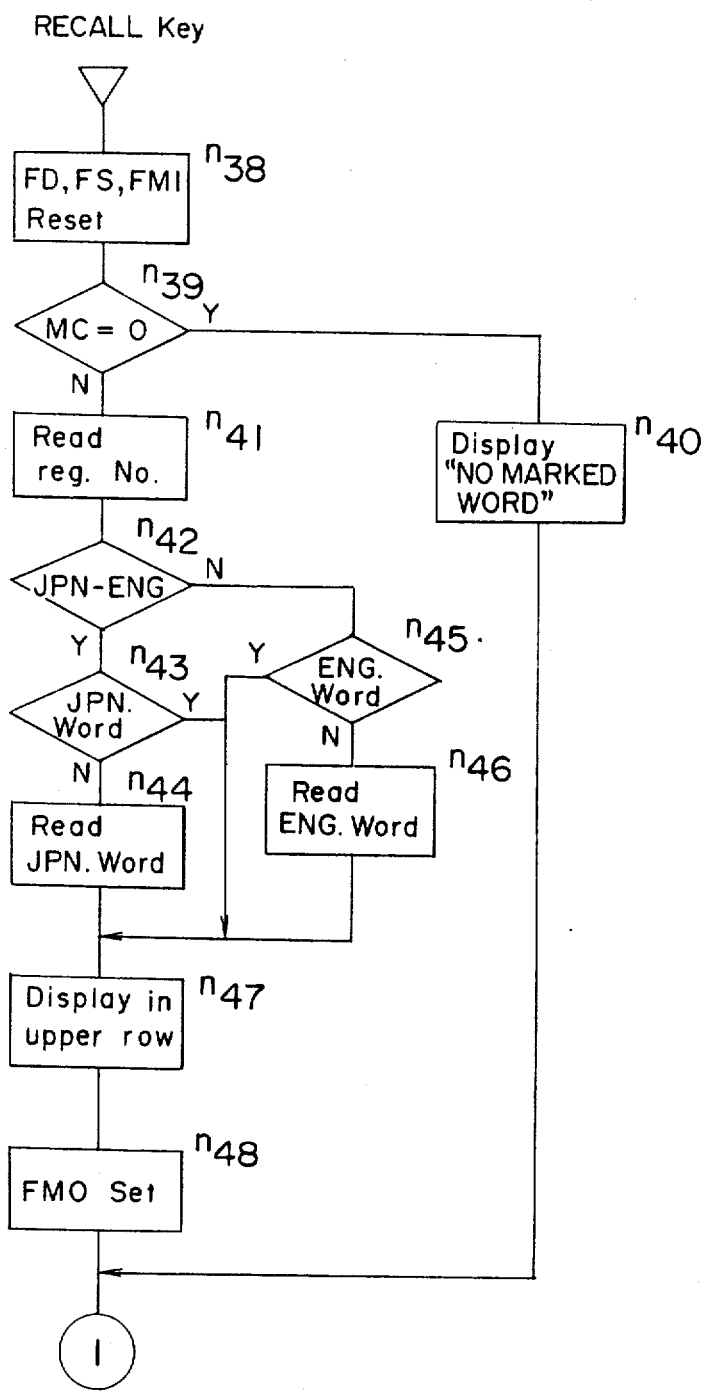
FIG. 9 is a flow chart for the operation when a recall key is depressed.

Referring to FIG. 8, when an English or Japanese word, which has not been marked yet, such as "hana", is displayed through the display unit 1, memory key 6 is depressed. At this moment, flag FMI is not yet set (flag FMI will be set later at step n31), and flag FMO is in the reset condition. Therefore, the program advances through steps n24 and n25 to step n26. At step n26, a register number of the word displayed, in this case, a register number of "hana", is stored in a mark memory and, at step n27, a prompt message, such as "MARK" as shown in FIG. 3, row (7), is displayed together with a cat-shaped symbol S2. The cat-shaped symbol S2 can be arranged in any other shape, and is provided to indicate that the displayed prompt message is just a message, and has nothing to do with the word to be marked, i.e., "hana" in the above given example. Then, at step n28, "1" is added to the contents of a counter MC. The counter MC is provided to count the number of marked words. Then, at step n29, it is decided whether the counter MC has counted up to the maximum available number or not. When the counter MC has counted up to the maximum available number, that is when the mark memory is full, a symbol S3 as shown in FIG. 3, row (7) is displayed for the indication that the mark memory is full, at step n30. After step n29 or n30, the program carries out step n31, at which flag FMI is set.

If the memory key 6 is depressed consecutively for a number of times, the operation is responsive only to the first depression. The depressions after the first depression are rendered as invalid key inputs, as explained below. When memory key 6 is depressed consecutively for the second time, flag FMI is in the set condition as accomplished in the previous procedure through step n31, and flag FMO is in the reset condition. Accordingly, in this case, the program follows the steps n24, n25 and ①.

Next, the steps for calling the marked word are described. Assuming that the word "hana" is marked through the program of FIG. 8, and that the word "hana" is not displayed in the unit 1, when recall key 7 is depressed under this condition, flags FD, FS and FMI are reset at step n38. Then, it is decided at step n39 whether or not the contents of the counter MC is equal to zero or not. If the counter MC is equal to zero, which means that there is no marked word, the program advances to step n40 at which a prompt message, such as "NO MARKED WORD" as shown in FIG. 3, row (8), is displayed together with the cat-shaped symbol S2. But, in the present situation, since the word "hana" is marked, the counter MC has counted at least up to "1". Thus, the program advances to step n41 at which the register number of the latest stored word, in this case the register number of the word "hana", is read out. Then, the dictionary ROM is scanned, at step n41, to find the word with the register number just read. At next step n42, it is detected whether the selected mode is English-Japanese mode or Japanese-English mode.

If the selected mode is English-Japanese mode, the program advances to step n45 at which it is detected whether the marked word found in the dictionary ROM is English or Japanese. Since the marked word "hana" is Japanese, the program advances to step n46 at which the word "hana" is translated to English "bloom", which is displayed in the upper row of the unit 1 at step n47. Thereafter, flag FMO is set at step n48. Returning back to step n45, if the marked word were English, the program advances directly to step n47 for displaying the marked word in the upper row of the unit 1.

Contrary to the above, if the selected mode is Japanese-English mode, the program advances from step n42 to step n43 at which step it is detected whether the marked word found in the dictionary ROM is English or Japanese. If the marked word is Japanese, it is directly displayed in the upper row of the unit 1. If the marked word is English, it is translated into Japanese at step n44, and the translated Japanese word is displayed in the upper row of the unit 1.

The marked word can be deleted through the steps described below.

First, the recall key 7 is depressed to display the marked word in the unit 1 through the above described steps. At this moment, flag FMO is set and flag FMI is reset. Then, mark key 6 is depressed. Thus, as shown in FIG. 8, the program advances through steps n24 and n32 to step n33, at which a prompt message, such as "DELETED WITH A MARK KEY" as shown in FIG. 3, row (9), is displayed together with the cat-shaped symbol S2. Then, flag FMI is set at step n31. Thereafter, when the mark key 6 is depressed again, the program advances through steps n24 and n32 to step n34 at which the register number of the marked word displayed in the unit 1 is deleted from the mark memory. Then, at step n35, a prompt message, such as "MARK DELETED" as shown in FIG. 3, row (10), is displayed together with the cat-shaped symbol S2. At step n36, counter MC is decremented by "1" and, at step n37, flag FMO is reset.

Figures 10, 11, 12:
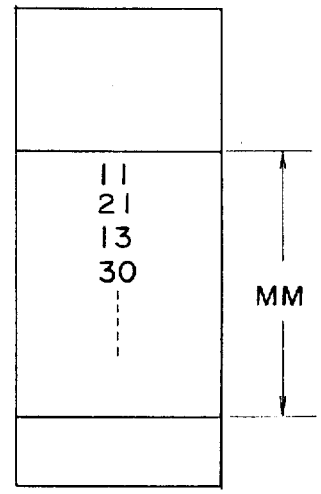
FIG. 10 is a diagrammatic view showing an alignment of words stored in dictionary ROM.
FIG. 11 is a diagrammatic view showing a Japanese word table.
FIG. 12 is a diagrammatic view showing an area in a microprocessor for storing register numbers.

Referring to FIG. 10, there is shown a diagrammatic view of an alignment of words stored in dictionary ROM. The words in English and Japanese are aligned alternately such that after each English word, the corresponding Japanese word or words follow. The words are separated from each other by suitable codes, or register numbers, disposed therebetween, e.g., in blank spaces shown in FIG. 10. Preferably, the English words are aligned in alphabetical order.

Referring to FIG. 11, there is shown a diagrammatic view of a Japanese word table containing Japanese words stored in Japanese alphabetical order (A I U E O . . . ) and a register number given to each word. The register numbers are the serial numbers given to the words stored in dictionary ROM, as shown in FIG. 10.

Whether there are any homonyms or not is detected by comparing the searched word with a word listed before or after the searched word in the table. If there are the same words listed twice one after another, it is so detected that homonyms exists for the searched word.

Referring to FIG. 12, a diagrammatic view of the mark memory provided in microprocessor MPU is shown. The mark memory has a predetermined size of memorizing area MM, and is so arranged as to memorize only the register number.

According to the present invention, not only the input word and translated word, but also the retranslated word is displayed in unit 1 through only one translation operation. Thus, the operator can pick a correct translated word.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of appended claims.

What is claimed is:

1. An electronic translator comprising:
   means for introducing a word of a first language, said introduced word having more than one meaning;
   means for translating said introduced word into a second language word having a same said meaning as said introduced word, said introduced word;
   means for retranslating said translated word back to said first language word to provide a retranslated word;
   means for providing a comment representative of the said meaning in said second language of said retranslated word in said first language; and
   means for indicating said introduced word, said translated word, said retranslated word, and said comment.

2. An electronic translator according to claim 1, wherein said means for indicating is a display.

3. An electronic translator according to claim 1, further comprising means for marking said introduced word to indicate the availabilities of another said meaning of said introduced word, and means for recalling said marked introducing word.

4. An electronic translator according to claim 1, further comprising means for producing a full word upon introduction of starting characters of said full word.

5. An electronic translator comprising:
   first memory means for storing words of a first language and words of a second language wherein each word of the first language is stored in an interlinked manner with at least one word of the second language, at least one of the words in said first language having more than one meaning and being interlinked with more than one word of said second language, each said word of said second language interlinked with said word in said first language, indicating a different meaning of said word in said first language having more than one meaning;
   input means for introducing a word of the first language;
   search means for searching for said introduced work in said first memory means;
   first producing means for recalling a word of the second language from said first memory means having a said interlinked relationship with said introduced word of said first language;
   second producing means for recalling said word of the first language from said first memory means having the said interlinked relationship with said word recalled by said first producing means;
   means for providing a comment representative of the meaning of said word of the second language recalled by said first producing means; and
   means for indicating said introduced word, said second language word recalled by said first producing means, said word in said first language recalled by said second means, and said comment.

6. An electronic translator according to claim 5, wherein said means for indicating is a display.

7. An electronic translator according to claim 5, wherein:
   said first memory means stores said words of the second language in a predetermined order;
   said translation further comprising;
   detecting means for detecting whether or not said introduced word has more than one meaning and is thusly a homonym;
   means, responsive to said detecting means, for producing a first symbol indicating the presence of said homonym.

8. An electronic translator according to claim 5, wherein said first memory means further stores register numbers corresponding to each word of the first and second languages stored in an interlinked manner.

9. An electronic translator according to claim 8, further comprising:
   first actuator means, responsive to said indicating means, for generating an audible pronunciation of said indicated word;
   second memory means for storing, in response to said first actuator means, a register number of the word indicated by said indicating means; and
   third producing means for recalling a word having said register number stored in said third memory means.

* * * * *